US008464936B2

(12) United States Patent  (10) Patent No.: US 8,464,936 B2
Zeigler  (45) Date of Patent: Jun. 18, 2013

(54) IDENTIFICATION CARD

(76) Inventor: Gary David Zeigler, Canton, OH (US)

( * ) Notice: Subject to any disclaimer, the term of this patent is extended or adjusted under 35 U.S.C. 154(b) by 156 days.

(21) Appl. No.: 12/951,670

(22) Filed: Nov. 22, 2010

(65) Prior Publication Data

US 2011/0121071 A1    May 26, 2011

Related U.S. Application Data

(60) Provisional application No. 61/264,468, filed on Nov. 25, 2009, provisional application No. 61/305,229, filed on Feb. 17, 2010, provisional application No. 61/315,871, filed on Mar. 19, 2010, provisional application No. 61/332,187, filed on May 6, 2010, provisional application No. 61/346,423, filed on May 19, 2010, provisional application No. 61/349,189, filed on May 27, 2010.

(51) Int. Cl.
    *G06K 5/00*    (2006.01)
(52) U.S. Cl.
    USPC ............ 235/380; 235/375; 235/487; 235/492
(58) Field of Classification Search
    USPC .................. 235/380, 375, 492, 487, 451, 382
    See application file for complete search history.

(56) References Cited

U.S. PATENT DOCUMENTS

| | | | |
|---|---|---|---|
| 5,268,963 A | 12/1993 | Monroe et al. | |
| 5,735,550 A | 4/1998 | Hinkle | |
| 6,412,692 B1 * | 7/2002 | Miyagawa | 235/382 |
| 6,641,050 B2 | 11/2003 | Kelley et al. | |
| 7,013,365 B2 | 3/2006 | Arnouse | |
| 7,328,850 B2 | 2/2008 | Sines | |
| 2004/0026915 A1 * | 2/2004 | Thompson et al. | 283/51 |
| 2004/0094617 A1 | 5/2004 | Hogans, Sr. | |
| 2004/0118930 A1 | 6/2004 | Berardi et al. | |
| 2004/0236819 A1 * | 11/2004 | Anati et al. | 709/200 |
| 2007/0234066 A1 * | 10/2007 | Dufour et al. | 713/186 |
| 2008/0099556 A1 * | 5/2008 | Park | 235/382.5 |
| 2010/0096452 A1 * | 4/2010 | Habraken | 235/382 |
| 2011/0001827 A1 * | 1/2011 | Ortiz et al. | 348/156 |

* cited by examiner

*Primary Examiner* — Edwyn Labaze
(74) *Attorney, Agent, or Firm* — Sand & Sebolt

(57) ABSTRACT

A secure identification card and method for authenticating a holder of an identification card is presented. The method stores personal information in the identification card that is personal to an owner of the card. When a holder of the card presents the card, the method allows the personal information that identifies the owner of the card to be extracted from the authorization card at an authorized establishment. The method then allows the authorized establishment to graphically display the personal information at the authorized establishment. This allows a person at the authorized establishment to verify, based on the graphical display of the personal information, that the holder of the card is the owner.

15 Claims, 3 Drawing Sheets

IDENTIFICATION CARD

CROSS-REFERENCE TO RELATED APPLICATIONS

This application claims priority from U.S. Provisional Application Ser. Nos. 61/264,468 filed Nov. 25, 2009; 61/305,229, filed Feb. 17, 2010; 61/315,871, filed Mar. 19, 2010; 61/332,187, filed May 6, 2010; 61/346,423, filed May 19, 2010; and 61/349,189, filed May 27, 2010; the disclosures of which are incorporated herein by reference.

BACKGROUND OF THE INVENTION

1. Field of Invention

The current invention relates generally to apparatus, systems and methods for identifying an individual. More particularly, the apparatus, systems and methods relate to associating an individual to a card device. Specifically, the apparatus, systems and methods provide for verifying a holder of the card is the owner of the card based on hidden data stored within a card device.

2. Description of Related Art

Transaction cards (e.g., credit cards, badges and access instruments) having been in use for many years. Transaction cards can be used for credit and/or debit types of transactions, library services and many other types of services and transactions. Typically a transaction or credit cards are formed from flat, angular pieces of plastic and have customer identifying information embossed, encrypted or otherwise forming part of the face or upper surface of the card. Often the back of a credit card contains a signature panel for an authorized cardholder to write their signature and a magnetic strip with identifying information magnetically encoded.

The widespread availability and convenient use of transaction cards for general financial transactions have proliferated the number of these cards (e.g., financial instruments) throughout the world. Along with the benefits and ease of use, these inexpensive and readily available cards are highly susceptible to unauthorized use and theft. Security depends on maintaining personal possession of the card and minimizing access to the account numbers as much as possible.

In the past, credit cards have had any card security number hidden within the plastic forming the card body as one method to assist in preventing card fraud. Similarly, some credit card companies have included photo identification of the cardholder printed on the face of the card. This photo identification requires extra processing steps for the credit card issuer, thereby increasing the card issuers costs.

A new and relatively simple method to improve identification card security is to prompt a person verifying the identity of the card holder to prompt the card holder for a photo identification (ID). For example, the photo ID may be a drivers license or some other commonly issued photo ID. The card holder can be verified as the true owner of the card when a photo ID matches the card holder. Even though these security measures can be taken to verify the ownership of a transaction card, additional or enhanced security measures may be desired.

SUMMARY OF THE INVENTION

The preferred embodiment of the invention includes a method for authenticating a holder of an identification card. The method stores personal information in the identification card that is personal and unique to an owner of the card. When a holder of the card presents the card, the method allows the personal information that identifies the owner of the card to be extracted from the authorization card at an authorized establishment. The personal information can be extracted using a scanner, authorized wireless device, or by another device. The method then allows the authorized establishment to graphically display the personal information at the authorized establishment. This allows a person at the authorized establishment to verify, based on the graphical display of the personal information, that the holder of the card is the owner. A financial transaction based, at least in part, on the personal information can be permitted when the holder of the identification card is verified as the owner of the card.

In another configuration of the preferred embodiment, the method allows the writing of data associated with a photograph of the owner of the identification card into the identification card. The data written into the secured transaction card can also include personal financial account information. The authorized establishment can then be allowed to graphically display the photograph at the authorized establishment to permit the person at the authorized establishment to verify, based on the graphically displayed photograph, that the holder of the card is the owner.

In one configuration of the preferred embodiment, the method includes initializing the identification card by writing the personal information that can include personal financial account information into the card. The personal information can be encrypted before the personal information is written onto the card. The identification card can be initialized by electronically writing the personal information into the card. The method prevents the card from being written to after it is initialized.

In another configuration of the preferred embodiment, the method verifies that an entity requesting the extraction of personal information is a trusted entity before allowing personal information to be extracted from the authorization card at an authorized establishment. The verifying can be based on a cryptographic key exchange between the identification card and the entity requesting the extraction of personal information.

In another configuration of the preferred embodiment, the method provides an exterior finish to the exterior of the identification card so that there is little to no personal information or photographs of the card owner on the exterior of the identification card. Additionally, there little to no financial account information on the exterior of the corresponding account.

In another configuration of the preferred embodiment, the method stores information about a first financial account and information about a second financial account into the identification card. The method permits the authorized establishment to read information of either the first or second financial account after the person at the authorized establishment verifies the holder of the identification card is the owner of the card.

Another configuration of the preferred embodiment includes a secure transaction card with a memory device configured to store personal information associated with an owner of the secure transaction card. For example, the memory device can be configured to store personal information including a photograph of the owner of the secure identification card. The memory device is configured to be read by a device external to the secure identification card. The secure identification card includes a card body that contains the memory device. The card body is at least partially destroyed if the memory device is removed from the card body. The card body does not display financial account information on the card body. The card body does not display a photographic image of the owner of the secure identification card on the card body.

In one configuration of the preferred embodiment, the secure identification card includes security logic to verify a device external to the secure identification card is associated with trusted entity. The security logic is configured to prevent reading of the personal information when the device external to the secure identification card is not a trusted entity. The security logic can perform a cryptographic key exchange and verification to verify the device external to the secure identification card is a trusted entity.

BRIEF DESCRIPTION OF SEVERAL VIEWS OF THE DRAWINGS

One or more preferred embodiments that illustrate the best mode(s) are set forth in the drawings and in the following description. The appended claims particularly and distinctly point out and set forth the invention.

The accompanying drawings, which are incorporated in and constitute a part of the specification, illustrate various example methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

Figure 1A:
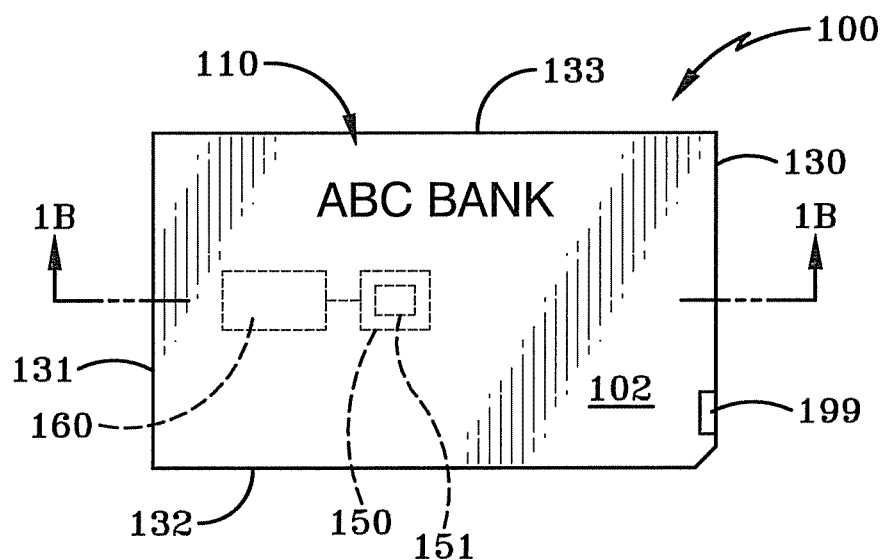
FIGS. 1A and B illustrate a preferred embodiment of a secure identification card.
Figure 1B:
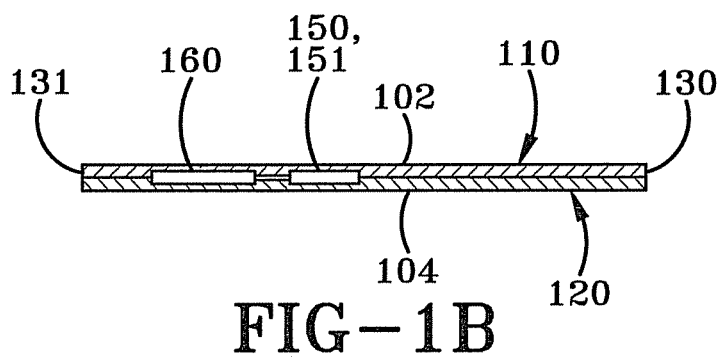

FIGS. 1A and 1B illustrate the preferred embodiment of a secured identification card 100. Unlike a traditional identification card such as a credit card or a debit card, the secured identification card 100 does not visibly display the traditional personal information or traditional account information associated with the card's owner. Instead most if not all of this information 151 is stored internal to the card 100 and can be extracted by authorized persons when the card holder uses the card 100. For example, when the card 100 represents a credit card and the card holder presents the card 100 to a cashier when making a purchase, the cashier will extract data corresponding to a photograph of the card owner. The photograph is then graphically displayed to the cashier so a comparison between the photograph the card holder can be made. The cashier can then accurately visually verify that the card belongs to the person making that purchase. Because there little or no personal information and little or no account information displayed on the card 100, it is more difficult an unauthorized person to modify the personal information 151 to suit their own identity.

The secure identification card 100 is generally a flattened box shaped structure similar to a traditional credit card or debit card. The preferred embodiment of the secure identification card 100 has an upper surface 102 and a lower surface 120 that are generally rectangle shaped. A right side 130, a left side 131, a bottom side 132 and a top side 133 are formed at the peripheral edges of the upper surface 102 and a lower surface 120.

In the preferred embodiment, the secured transaction card 100 can be formed with a separate upper portion 110 and a separate bottom portion 120. A memory device 150 is sandwiched between the upper and lower portions 110, 120. The memory device 150 is installed within the secure identification card 100 so that if an attempt is made to remove the memory device 150, the card 100 would be destroyed and the memory device 150 would no longer function. The upper and lower portions 110, 120 can be connected together with adhesive material or in any other way as understood by person of ordinary skill in the art. In alternative configurations of the preferred embodiment, the upper and lower portions 110, 120 can be formed out of a single piece of material or the secure identification card 100 can be formed with more than two layers of material.

In one configuration of an embodiment, the memory device 150 is configured to store encrypted personal information 151. The personal information 151 may have been encrypted before it is received by the secure identification card 100. Alternatively, the security logic 160 can receive unencrypted personal information 151 and then encrypt it before it is stored in the memory device 150.

In some embodiments of the preferred embodiment of the secure identification card 100, the card 100 includes security logic 160. The security logic 160 is configured to verify that a device external to the secure identification card 100 is a trusted device. For example, when a store clerk begins to verify that the card holder is the card's owner they will scan the card 100 with an electronic device that can read the card 100. However, before the security logic 160 allows the memory device 150 to be read by the scanner, the security logic 160 will first verify that the scanner is a trusted device (e.g., trusted source). The security logic is configured to prevent reading of the personal information 151 when the device external to the secure identification card 100 is not a trusted device. Even though in this example the scanner is discussed as being the trusted device, the scanner may merely be part of a network that is control by electronic devices (e.g., computers) by a credit card company. In this case, the security logic 160 is configured to determine that the electronic devices of the credit card company are trusted device(s). In general, an electronic device in a network that is initiating the reading of the secured identification card 100 is the potential trusted device (or non-trusted device).

In another configuration of the preferred embodiment, the secured identification card 100 can contain other logic and perform other actions. For example, the card 100 may include a microprocessor, microchip, electronic control logic or other logic as understood by those of ordinary skill in the art to assist the security logic 160 with processing/authenticating write and/or read request to the memory device 150. This microprocessor, microchip, electronic control logic or other logic can be configured to be activated by an external scanning device. Also, if the secure identification card 100 is stolen, the microprocessor, microchip, electronic control logic or other logic can be contacted from a remote device to disable the card 100. The microprocessor, microchip, electronic control logic or other logic can be configured to recognize the voice of the card owner. As discussed below, these voice recognition features allow the card 100 to be used for Internet, cellular phone and other wireless uses where the photograph of the card owner cannot be immediately verified. The Internet or cellular phone can be electrically connected to a port 199 on the card 100 to allow financial information to be passed during the financial transaction after the voice recognition features verify that a card holder (e.g., user) is the owner of the card 100.

In a second embodiment, the memory device 150 may be written to multiple times. When the memory device 150 is a read/write type of memory, the security logic 160 can be configured to authenticate a write request from potentially trusted device. In this embodiment, the security logic 160 can perform a cryptographic key exchange with the potentially trusted device. For example, a Diffie-Hellman key exchange can be performed to generate a secure signature. The security logic 160 is then configured to determine if the requesting device is a trusted device based on whether a secure signature is valid or not. Of course, the cryptographic authentication process can be performed between the secure identification card and the potentially trusted device in other ways as understood by those of ordinary skill in the art.

Having described the structure of the interior identification card 100, the use and operation of the card 100 will now be described in further detail. As mentioned briefly above, before the secure identification card 100 is issued to its owner, it needs to be initialized. In the preferred embodiment, after the card 100 has been initialized its number device 150 cannot be written to a second time. As discussed above, this feature makes this secure identification card 100 more secure than a conventional credit card because no personal information 151 or account information is displayed on the card 100. Because personal information 151 is displayed on a conventional card an unauthorized user can modify a photo displayed on the conventional card so that they appear as the proper owner of the card. The secure identification card 100 does not display a photo of the owner or any other personal information 151 on the card surface so that the thief cannot know this information.

A drivers license photograph can be used as the photograph stored in the memory 150 without requiring the card issuer to physically verify that the card holder matches the photograph in the memory. For example, the future cardholder could sign a release form allowing his state's drivers license bureau to electronically submit his driver's license photograph to a credit card issuer who will then load that picture into the memory device 150. Those who do not have a drivers license can submit their photo electronically by visiting a post office, bank, or another local location.

In addition to a photograph of the owner and account information, other data may be stored in memory device 150. For example drivers license information, Social Security information, name, birth date, expiration date of the card, other credit card or debit card information, medical information, and other information can be stored in the memory device. The medical information about the cardholder would not generally be extractable by typical device that can read the card 100. A special card reading device that is generally only available to medical personnel, police and the like would be able to read the medical information from the card 100. Alternatively, the secure identification card 100 could be used as a passport type of device because of the secure nature of the photograph of the card holder.

The secure identification card 100 and also be used at an automatic teller machine (ATM), gas pumps and other self-service locations. For example, at a gas pump the secure identification card 100 can be inserted in the gas pump. The gas pump will then instruct the user of the card 100 to look at it a small camera on the gas pump that will capture an image of the user. Photo recognition software at the gas pump or on a network connected to the gas pump then determines whether the photograph just taken matches a photograph stored in a secure identification card 100. Conversely, the gas station attendant may be presented with the two images, and proceed to manually compare the two for a match. Of course, if the photographs match then the gas pump is enabled for operation, either electronically and automatically through software, or manually by the gas station attendant. If the photos do not match, then the gas pump will keep the card and may generate an alarm indicating the fraudulent use of the card 100. The photograph taken of the card user can be forwarded to law enforcement officials.

More than one photograph can also be stored in the memory device 150. For example, photographs of a spouse or other family members that are authorized to use the card 100 could also restored in the memory device 150. When the secure identification card 100 is used appropriate photograph can be recalled from the memory device 150 and used to verify that the card holder is a valid user of the card.

The secure identification card 100 can also be useful when purchasing tickets such as airline tickets. For example, when the card 100 is used to purchase an airline ticket, the photograph of the cardholder be extracted from the memory device 150 an then can be printed on the airline ticket at the time of purchase. Later, this picture on the airline ticket can be used by airport security to indicate that the holder of the ticket is the owner of the ticket for.

The secure information card can also be used to make purchases via a cell phone, the Internet and in other situations where the photograph cannot be immediately verified. The microprocessor, microchip or other logic implementing voice-recognition features in the card 100 can be used to verify that a user of the card 100 is the card owner. The card user can first connect a communications cable between the port 199 on the card 100 and a cell phone or Internet. While requesting the transaction, the remote location will prompt the card user to verify with their voice that they are the card owner. For example, the card owner may need to speak a password or a pin number. Next, the voice recognition logic and/or software will determine if that was the voice of the card owner. When the card user is determined to be the card owner, the financial information may be extracted from the card, transmitted remote location and used to complete the remote purchase. Of course, the security logic 160 can first encrypt the data before it is sent to the remote location.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 2:
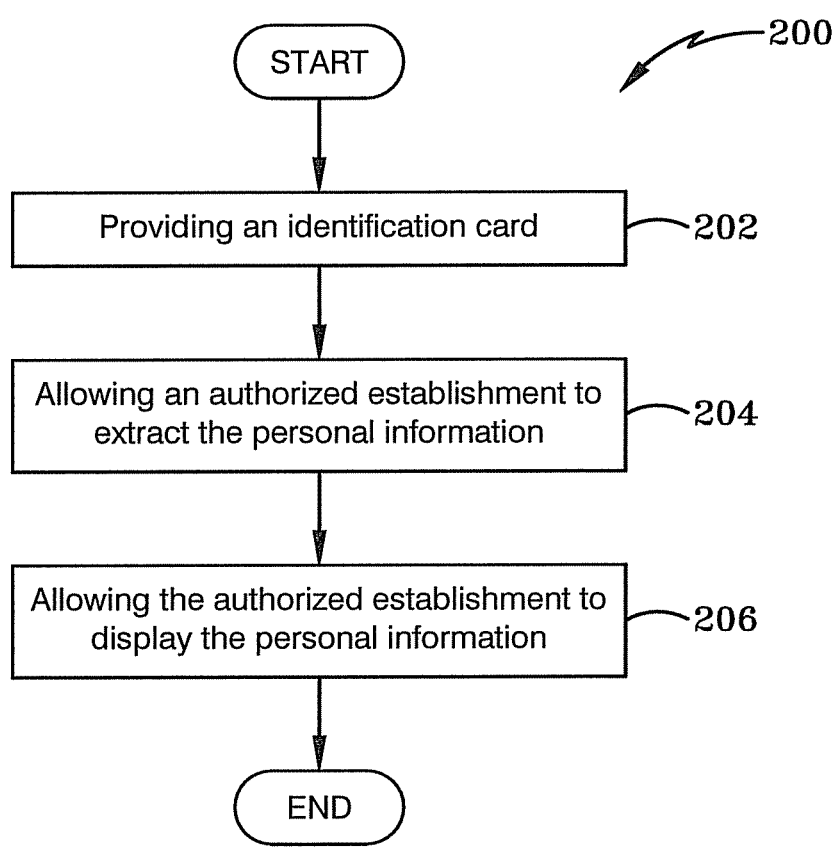
FIG. 2 illustrates an embodiment of a method for authenticating a holder of an identification card as the owner of the card.

FIG. 2 illustrates a method 200 of authenticating a holder of an identification card as the owner of the card. The information card is similar to a secure identification card 100 discussed earlier. The card is generally does not have personal information about the card owner(s) printed on the exterior surfaces of the card.

The method 200 begins by providing the identification card to an owner of an identification card, at 202. For example, a credit card company would assign a credit card number to a customer, store than umber into a memory in the credit card and then send a corresponding identification card to the customer.

Later, the credit card customer will present the identification card to a merchant when making a purchase. Method 200 allows the personal information that identifies the owner of the card to be extracted, at 204, from the authorization card at the merchant's location (e.g., authorized establishment). Next, the authorized establishment is permitted to graphically display the personal information at the authorized establishment, at 206. The merchant, based on the graphical display of the personal information (the card holder's photograph), verifies that the holder of the card is the owner of the card. After this has been verified, the holder of the card is permitted to make the purchase using account information on the card.

Figure 3:
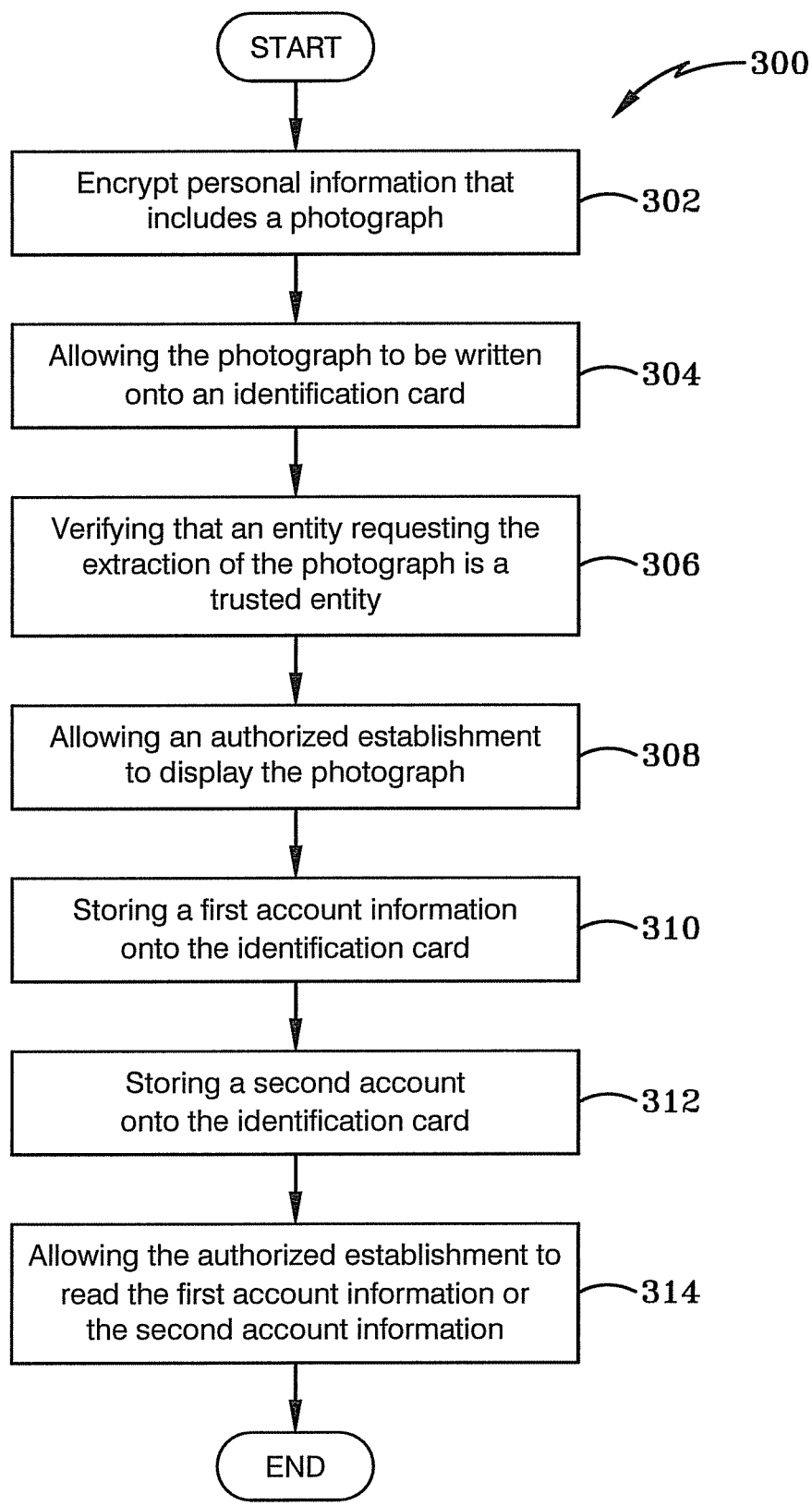
FIG. 3 illustrates another embodiment of a method for authenticating a holder of an identification card as the owner of the card.

FIG. 3 illustrates another method 300 of authenticating a holder of an identification card as the card owner. The method 300 begins by encrypting a photograph, at 302. This encryption is performed before the photograph is written onto the card. The photograph or other personal information such as financial account information can be encrypted by a microprocessor or other encryption logic on a secured card when the personal information is received by the secured card. Alternatively, the photograph can be encrypted by a device external to information card and then already be encrypted before it is received by a information card. The photograph can be encrypted by any encryption method as understood by those of ordinary skill in the art. For example the photograph or other personal information can be encrypted with a block cipher such as the enhanced encryption standard (EAS), the data encryption standard (DES), a hash function or another encryption method.

The method 300 continues by allowing the writing the photograph of the owner of the identification card into the identification card, at 304. As previously mentioned, this data can be stored in an integrated circuit embedded within the identification card. If there is an unauthorized attempt to remove a circuit from the card, the circuit and card would be destroyed. As previously discussed, the memory in the card may be a type of memory that can be initialized and written to with the photograph and other personal information but then can only be read. This single write type of memory prevents unauthorized personnel from rewriting or changing the contents of the memory.

The method 300 verifies that an entity requesting the extraction of personal information is a trusted entity, at 306. The verification is performed before allowing a picture or other personal information to be extracted from the authorization card at an authorized establishment. For example, a cryptographic key exchange such as a Diffie-Hellman type of key exchange may be performed and cryptographic signatures calculated to verify a trusted entity is requesting the photograph and/or other personal information. The trusted entity and the authorized establishment may be two different entities. For example, a merchandise store may be the authorized establishment where the reading of the photograph is to take place and an authorized entity may be a credit card company that makes the request to read the photograph from its computer system at a location remote from the merchandise store.

The authorized establishment is allowed to graphically display the photograph at the authorized establishment, at 308. This allows a person at the authorized establishment to verify, based on the photograph, that the holder of the card is the owner. After the card holder is verified as the owner of the card, the method can allow a financial transaction to take place based, at least in part, on the personal information in the card.

Information of a first financial account is stored in the identification card, at 310, and information of a second financial account is stored in the identification card, at 312. If the memory device of the card is a one-time writable memory, then the information about the first and second financial accounts would need to be written when a photograph and other personal information is written to the card as discussed above (at 304). The method 300 allows the authorized establishment to read information about the first or second financial account, at 314, after the person at the authorized establishment verifies the holder of the identification card is the owner.

In another embodiment of the method 300, the method 300 provides an exterior finish to the exterior of the identification card so that there is little or no personal information on the exterior of the identification card. The exterior finish can also have little or no indication of personal financial account information on the exterior of the identification card.

In the foregoing description, certain terms have been used for brevity, clearness, and understanding. No unnecessary limitations are to be implied therefrom beyond the requirement of the prior art because such terms are used for descriptive purposes and are intended to be broadly construed. Therefore, the invention is not limited to the specific details, the representative embodiments, and illustrative examples shown and described. Thus, this application is intended to embrace alterations, modifications, and variations that fall within the scope of the appended claims.

Moreover, the description and illustration of the invention is an example and the invention is not limited to the exact details shown or described. References to "the preferred embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in the preferred embodiment" does not necessarily refer to the same embodiment, though it may.

What is claimed is:

1. A method of authenticating a person holding an identification card comprising:
   providing the identification card to an owner of the identification card;
   when the holder of the card presents the card, allowing personal information that identifies the owner of the card to be electronically extracted from the identification card by an authorized establishment;
   allowing the authorized establishment to graphically display the personal information at the authorized establishment to permit a person at the authorized establishment to visually compare the displayed personal information and the holder to manually verify that the holder of the identification card is the owner of the card.

2. The method of claim 1 where the initializing the identification card further comprises:
   providing the identification card free of surface indicia containing the personal information.

3. The method of claim 1 further comprising:
   initializing the identification card by writing the personal information into the identification card; and preventing the identification card from being written to after the identification card is initialized.

4. The method of claim 1 further comprising:
initializing the identification card by electronically writing the personal information into the card.

5. The method of claim 1 further comprising:
encrypting the personal information before the personal information is written into the card.

6. The method of claim 1 wherein the personal information includes financial account information.

7. The method of claim 6 further comprising:
providing an exterior finish to the exterior of the identification card so that there is no indication of the personal information on the exterior of the identification card, wherein the exterior finish there is no indication of the financial account information on the exterior of the identification card.

8. The method of claim 1 further comprising:
allowing a financial transaction based, at least in part, on the personal information when the holder of the identification card is verified as the owner.

9. The method of claim 1 further comprising:
storing a first account information of a first financial account on the identification card;
storing a second account information of a second financial account on the identification card; and
allowing the authorized establishment to read one of the first financial account information and the second financial account information after the person at the authorized establishment verifies the holder of the identification card is the owner.

10. The method of claim 1 wherein the allowing personal information to be extracted from the identification card further comprises:
allowing the personal information to be extracted by one of the group of: a scanner and an authorized wireless device.

11. A method of authenticating a person holding an identification card comprising:
providing the identification card to an owner of the identification card;
when the holder of the card presents the card, allowing personal information that identifies the owner of the card to be extracted from the identification card by an authorized establishment;
allowing the authorized establishment to graphically display the personal information at the authorized establishment to permit a person at the authorized establishment to verify, based on the graphical display of the personal information, that the holder of the identification card is the owner of the card; and
before allowing personal information to be extracted from the identification card at the authorized establishment, verifying that an entity requesting the extraction of personal information is a trusted entity.

12. The method of claim 11 wherein the verifying that the entity requesting the extraction of personal information is a trusted entity further comprises:
verifying the entity requesting the extraction of personal information is a trusted entity based on a cryptographic key exchange between the identification card and the entity requesting the extraction of the personal information.

13. A secure identification card comprising:
a memory device configured to store personal information associated with an owner of the secure transaction card, and wherein the memory device is configured to be read by a device external to the secure identification card; and
a card body that contains the memory device, wherein the card body is at least partially destroyed if the memory device is removed from the card body, wherein the card body does not display financial account information on the card body, and wherein the card body does not display a photographic image of the owner of the secure identification card on the card body; and
security logic configured to verify the device external to the secure identification card is associated with is a trusted entity, wherein the security logic is configured to prevent reading of the personal information when the device external to the secure identification card is not a trusted entity.

14. The secure identification card of claim 13, wherein the security logic is configured to perform a cryptographic key exchange and verification to verify the device external to the secure identification card is a trusted entity.

15. A secure identification card comprising:
a memory device configured to store personal information associated with an owner of the secure transaction card, and wherein the memory device is configured to be read by a device external to the secure identification card; and
security logic configured to verify the device external to the secure identification card is associated is a trusted entity, wherein the security logic is configured to prevent reading of the personal information when the device external to the secure identification card is not a trusted entity.

* * * * *